United States Patent [19]

Scheibengraber

[11] Patent Number: 4,524,583

[45] Date of Patent: Jun. 25, 1985

[54] STIRLING ENGINE

[76] Inventor: Karl J. Scheibengraber, 6025 W. Spencer Pl., Milwaukee, Wis. 53218

[21] Appl. No.: 547,114

[22] Filed: Oct. 31, 1983

[51] Int. Cl.³ .......................... F02G 1/00; F16H 21/22

[52] U.S. Cl. .......................................... 60/525; 74/44; 74/579 R

[58] Field of Search ....................... 60/517, 525; 74/44, 74/25, 579 R, 579 E

[56] References Cited

U.S. PATENT DOCUMENTS

| | | | |
|---|---|---|---|
| 1,098,012 | 5/1914 | Brown, Jr. | 74/44 |
| 2,040,401 | 5/1936 | Persons | 74/44 X |
| 3,175,544 | 3/1965 | Hughes | 74/44 |
| 3,385,051 | 5/1968 | Kelly | 60/525 |

*Primary Examiner*—Stephen F. Husar
*Attorney, Agent, or Firm*—Fuller, House & Hohenfeldt

[57] ABSTRACT

A Stirling engine has power transmitting connecting rods which slideably extend through diametral apertures in the pistons. A double-acting Stirling engine having center-actuated pistons eliminates the piston rods protruding through the end wall of the cylinders. The reciprocating piston motion is transmitted outside the cylinder by a piston rod extending transversely through the piston and cylinder wall to a connecting means journaled to receive the crank throw of a single crankshaft. The hot ends of the engine cylinders are all arranged about the central heat source, and the cool ends are all mechanically distant and thermally isolated from the heat source and crankcase, thus simplifying the cooling requirements of the engine.

14 Claims, 7 Drawing Figures

STIRLING ENGINE

BACKGROUND OF THE INVENTION

1. Field of the Invention

This invention pertains to apparatus for converting thermal energy into mechanical energy, and more particularly to apparatus for converting the heat energy of burning fuel in an external combustion engine into rotary mechanical motion.

2. Description of the Prior Art

The Stirling engine, which has been well-known for over 100 years, possesses several characteristics that make it very attractive as a prime source of mechanical power. Particularly in multi-cylinder engines, these characteristics include quietness, high thermal and mechanical efficiencies, and the ability to use many different fuels. Further, the normal heat-to-mechanical energy conversion of the Stirling cycle is reversible, so that input of mechanical energy enables a Stirling engine to operate as a refrigerator or heat pump.

The flexibility with which the cylinders of a multi-cylinder engine can be arranged has not been fully exploited in the prior art Stirling engines. In a recent multi-cylinder engine design, the cylinders are grouped in banks of adjacent in-line cylinders supplied with heat from a single heat source. Each bank of cylinders requires a linear-to-rotary motion converter, such as a crankshaft (U-drive arrangement). To maintain the timing between the banks, the crankshafts must be connected with timing gears or similar devices. Multiple crankshafts and multiple timing devices are undesirable because they add weight and expense to the engine.

A solution to the U-drive multi-crankshaft problem is shown in U.S. Pat. No. 3,200,602, wherein the two banks of cylinders converge toward a single crankshaft (V-arrangement). However, the penalty is that a single heat source may not be possible for supplying both banks of cylinders without becoming unduly large and wasteful of heat. Some designs utilize a swash plate to convert the reciprocating motion of the pistons in two adjacent banks to rotary motion. However, swash plates are failure-prone, expensive to manufacture, and introduce unncecssary complexities into the Stirling engine.

Despite its inherent advantages, the multi-cylinder Stirling engine has not proven a commercial success. One reason is that, since each piston is double acting, both ends of the cylinders in which the pistons reciprocate must be sealed against leakage of the working fluid.

In the prior art Stirling engines, a piston rod extends through one end of the cylinder to the components that convert the piston reciprocating motion to rotary motion. Thus, the joint between the piston rod and cylinder end wall must be well sealed. Operating pressures of the working fluid in the cylinders may reach 2,500 pounds per square inch, making sealing extremely difficult. Adequate sealing has proven to be a major problem, as explained in the book "Stirling Engines" by G. Walker, Clarendon Press, pages 360–383, and in the articles "Stirling Auto Engine", *Popular Science,* January, 1983, page 50, and "Stirling-Cycle Engine Promises Low Emissions Without Add-ons", *Popular Science,* February, 1973, page 72. Although these publications discuss the sealing problem, it is apparent that no adequate solution has been found.

Another shortcoming of prior art Stirling engines, as exemplified by the publications mentioned previously and by U.S. Pat. Nos. 3,200,602 and 3,379,026, is that the cool ends of the cylinders are located between the hot ends and the crankcase. In that location, the mass of the engine tends to retain heat that flows thereto from other parts of the engine. To maintain proper operation of the engine, the heat must be removed by a large, costly and complicated cooling system incorporating a water-filled radiator and cooling jacket. In addition, heat in the crankcase region is undesirable because it exacerbates the piston rod sealing problem.

Thus, a need exists for a single crankshaft multi-cylinder Stirling engine that eliminates piston rod sealing problems and that employs a single heat source to serve a multiplicity of cylinders having thermally isolated cool ends.

SUMMARY OF THE INVENTION

In accordance with the present invention, a Stirling engine is provided that utilizes a single heat source with a plurality of cylinders having thermally isolated cool ends and that utilizes simplified mechanical motion conversion components. This is accomplished by apparatus that includes engine cylinders that project outwardly in symmetrical pairs from a common heat source. In one embodiment of the invention, the longitudinal axes of the cylinders in a symmetrical pair coincide, and two pairs of cylinders are arranged in parallel side-by-side relationship, thus forming a double-banked in-line engine. In a modified embodiment, the longitudinal axes of the cylinders in a symmetrical pair coincide, and the axes of two pairs of cylinders intersect at a right angle, thus forming an X-shaped or radial engine. In a further modified embodiment, the axes of the cylinders in a symmetrical pair intersect at an angle of 90°, and a second pair of similar cylinders is placed in parallel side-by-side relationship, thus forming a double-banked V engine.

It is a feature of the present invention that the cool ends of the engine cylinders are mechanically remote and thermally isolated from the central heat source, the hot ends, and the crankcase. Because of such mechanical remoteness, the cool ends have less tendency to retain engine heat, and they may be more easily cooled than in conventional engines.

Further in accordance with the present invention, a Stirling engine is provided that eliminates the seals between the piston rods and the cylinder end walls. This is accomplished by employing dual-headed pistons, each having an aperture extending transversely through a relieved waist section interposed between the two piston heads. Each piston reciprocates within an engine cylinder having ends closed by cylinder end walls. Each cylinder is constructed with two longitudinal slots on opposite sides of the cylinder periphery. The slots are aligned with the piston aperture, and the slot lengths correspond with the linear distance the dual-headed piston travels during a cycle. To transmit the piston linear motion outside the cylinder, a piston rod extends through the transverse aperture in the piston waist and through the cylinder slots.

In the double-banked in-line embodiment of the present invention, one end of the piston rods of each symmetrical pair of cylinders terminates in a cross-bore yoke. The second end of each piston rod is normally free. The yoke is provided with a suitable bearing for receiving the crank throw of a conventional crankshaft.

In this embodiment, a crankshaft having two crank throws is required.

In the modified embodiment of the present invention, the X-shaped or radial engine, each piston rod is connected to the rods of both adjacent cylinders, thus forming a "picture frame" linkage lying parallel to the plane of the cylinders. One corner of the linkage is provided with suitable bearings for receiving the throw of a crankshaft. In this embodiment, a single throw crankshaft is sufficient for the four cylinders.

In the further modified embodiment of the present invention, the V engine, the piston rods of both cylinders in each pair are joined at one end to an L-shaped linkage. The second ends of the rods are normally free. The linkage for each pair of rods is suitably journaled for receiving the crank throw of the crankshaft. In this embodiment, a two-throw crankshaft is required for a double-banked engine. To balance the crankshaft without requiring counterweights, the two crank throws are preferably located at 180° to each other.

Other objects and advantages of the invention will become apparent from the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
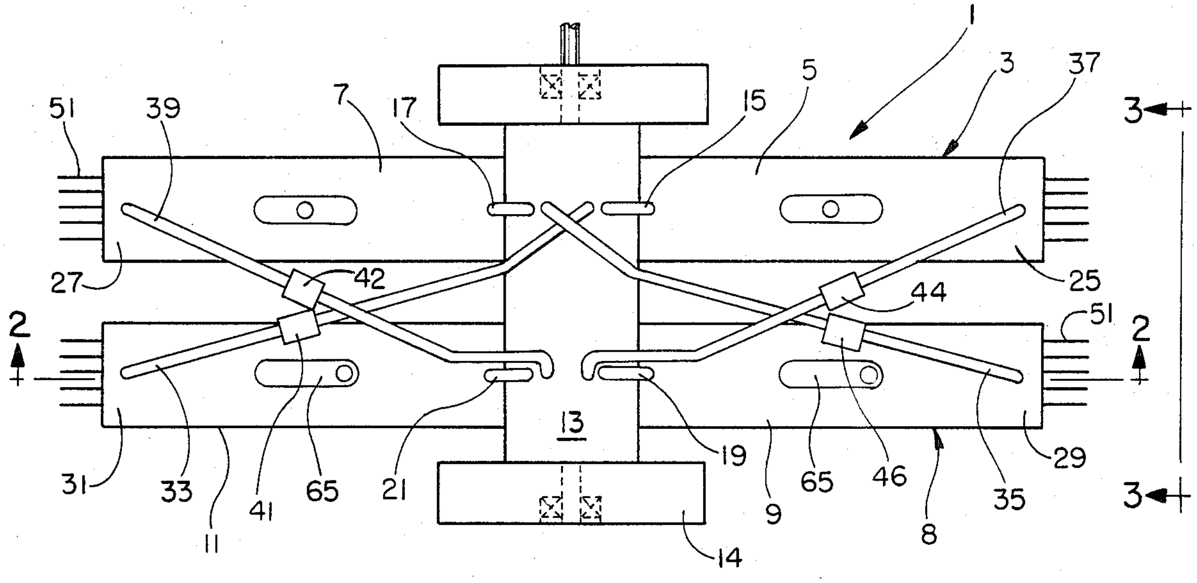
FIG. 1 is a partially schematic top view of one embodiment of a Stirling engine incorporating the present invention.
Figure 2:
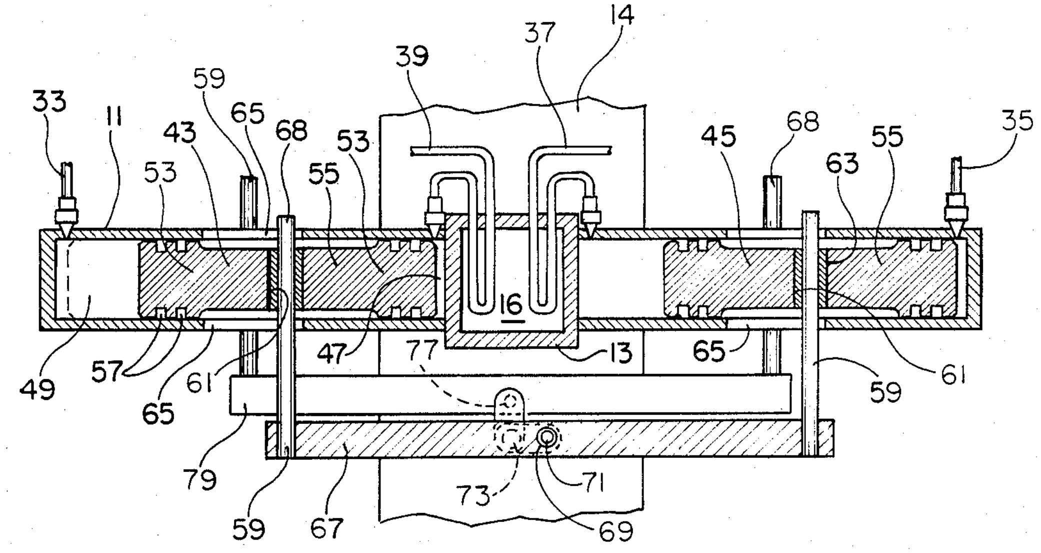
FIG. 2 is a sectional view taken along lines 2—2 of FIG. 1.
Figure 3:
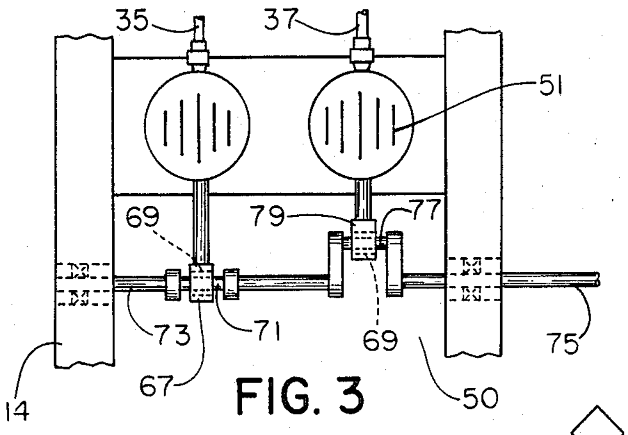
FIG. 3 is a side view of the Stirling engine taken along lines 3—3 of FIG. 2 and rotated 90° clockwise.

Referring to FIGS. 1-3, an apparatus 1 is illustrated that includes one embodiment of the present invention. The apparatus is configured as a Stirling-cycle engine, but it will be understood that the invention is not limited to Stirling engine applications.

The illustrated embodiment comprises a first pair 3 of symmetrical cylinders 5 and 7, and a second pair 8 of symmetrical cylinders 9 and 11 mounted in-line with the first pair. Within the cylinders are four double-acting pistons and eight cylinder spaces connected in the well-known Siemens arrangement. The cylinders 5, 7, 9 and 11 project outwardly from a central heat input source 13.

The heat input source 13 may be supported by a frame or wall 14. The heat source supplies heat to a suitable engine working fluid in the cylinder spaces (helium, hydrogen, or air). A primary advantage of the Stirling engine is the ability to burn a wide variety of fuels, such as kerosene, gasoline, and diesel fuel, by conventional equipment not shown. The cylinders 5, 7, 9, and 11 may be constructed integrally with the walls of the heat source 13 or they may be fastened thereto by appropriate and well known means.

The ends 15, 17, 19, and 21 of the cylinders 5, 7, 9, and 11, respectively, that lie adjacent to the heat source 13 are commonly referred to as the hot ends. The ends 25, 27, 29, and 31 that lie remote from the heat source are referred to as the cool ends.

The hot end of each cylinder is connected to a cool end of an adjacent cylinder by suitable conduits shown schematically at 33, 35, 37, and 39. For example, in FIG. 1 the hot ends of cylinders 5, 7, 9, and 11 are connected to the cool ends of cylinders 11, 9, 5, and 7, respectively, by conduits 33, 35, 37, and 39, respectively. As shown in FIGS. 1 and 2, and as an optional construction, the conduits 33, 35, 37, and 39 can pass through the combustion chamber 16 of the heat source 13. Reference numerals 41, 42, 44, and 46 schematically indicate regenerators that are well known in the art and whose function will be explained presently. The regenerators are interposed in the respective conduits between the hot and cool ends of the cylinders.

The thermal energy of the burning fuel in chamber 16 is transformed to mechanical energy by first heating the engine working fluid. The heated working fluid then acts upon a piston, as at 43 in FIG. 2, which reciprocates within its cylinder between the hot and cool ends. The reciprocating piston shuttles the working fluid back and forth in a closed circuit between the hot end of its own cylinder and the cool end of a first adjacent cylinder, and between the cool end of its own cylinder and the hot end of a second adjacent cylinder. For example, in FIGS. 1 and 2 piston 43 reciprocates within cylinder 11, thereby causing working fluid to flow between hot chamber 47 and the cool end 27 of cylinder 7. Similarly, working fluid flows back and forth between cool chamber 49 and the hot end 15 of cylinder 5.

By way of a brief explanation of the Stirling cycle, it will be assumed that piston 43 in FIG. 2 is at the end of its stroke closest to the heat source 13, or top dead center. In this position, hot expanding gas in chamber 47 forces the piston to the left in a power stroke. The gas is supplied to chamber 47 from the cool end 27 of cylinder 7 via conduit 39 and regenerator 42. In the regenerator, the cool compressed gas from cylinder 7 is heated with energy previously stored therein. The heat from the burning fuel in combustion chamber 16 further raises the temperature and pressure of the gas from cylinder 7. As the piston 43 moves to the left in the power stroke, it compresses gas in the cool chamber 49 and shuttles it through conduit 33 and regenerator 41 to supply the hot end 15 of cylinder 5 in an identical manner to which the chamber 47 of cylinder 11 is supplied from the cool end 27 of cylinder 7.

At the end of the power stroke, the piston 43 is at bottom dead center, at which point it reverses direction and moves toward the right in FIG. 2. As it moves to the right, it shuttles the gas in the hot chamber 47 to the cool end 27 of cylinder 7. The gas from hot chamber 47 passes through the regenerator 42 where its heat is stored in conventional fashion before entering the cool end 27 of cylinder 7, where additional heat is transferred to a sink. At the same time the piston is shuttling gas out of the hot end 15, through the regenerator 41, where a portion of its heat is given up, to the cool chamber 49. Thus, the cool chamber 49 of cylinder 11 is supplied with cool gas in the identical manner in which piston 43 supplies cool gas to cylinder 7.

The cycles of each of the four cylinders of the Stirling engine incorporating the invention of FIGS. 1-3 are identical. To generate the power output of the engine, the four simultaneous cycles are compounded in quadrature phase relationship, which means that the cycles are all out of phase by one-quarter of the complete cycle.

Following the preferred embodiments of the present invention, the cool ends 25, 27, 29, and 31 are located a maximum distance from the heat source 13, hot ends 15, 17, 19, and 21, and the crankcase region 50, FIG. 3. Locating the cool ends remote from sources of engine heat and the crankcase simplifies the cooling of the cool ends, because heat conducted from the heat source and hot ends will tend to dissipate before reaching the cool ends. Thus, a smaller cooling system than was previously possible will be satisfactory. In some applications, air-cooled heat radiating fins, as schematically represented by reference numeral 51, FIGS. 1 and 3, may provide sufficient cooling.

Further in accordance with the present invention, the reciprocating motion of the pistons is converted to continuous rotary motion in a manner that eliminates the seal problem of conventional Stirling engines. This is possible because the links between the pistons and the crankshaft do not penetrate any of the gas-filled cylinder spaces. In the embodiment illustrated in FIGS. 1-3, the reciprocating motion of each dual-headed piston is transferred to a piston rod that projects laterally through the piston and cylinder. Each piston and cylinder is constructed in an identical fashion, so the description of one will be sufficient. Piston 43 is comprised of two identical piston heads 53 with a relieved waist portion 55 interposed therebetween. To seal the chambers 47 and 49, the piston heads are provided with one or more conventional or PTFE piston rings 57.

To transmit the reciprocating piston motion outside the cylinders, a piston rod 59 protrudes laterally from each piston waist 55 through an aperture 61 in which may be inserted a suitable linear bearing 63. Each cylinder is machined with diametrically opposite elongated slots 65 for allowing the piston rods to pass through the cylinder walls.

One end of each piston rod 59 in the symmetrical cylinders of pair 8 is rigidly fastened to a common cross-bore yoke 67, thus linking the pistons to identical reciprocating motions. If desired, the rod free end 68 may be joined with a suitable cross piece, not illustrated.

To convert the reciprocating motion of the pistons to continuous rotary motion, the yoke 67 is provided with a suitable journal bearing 69 which receives the crank throw 71 of a crankshaft 73 rotatably mounted in frame 14. The crankshaft is provided with a second crank throw 77 for receiving the cross bore yoke 79 of cylinder pair 3, which is constructed in a manner identical with cylinder pair 8. The crank throw 77 is located at 90° to crank throw 71. Thus, the cycle of cylinder pairs 3 and 8 are out of phase by 90°, and the cycles of the cylinders 5, 7, 9, and 11 are all out of phase by one-quarter of the cycle. The result is a smooth flow of power to the drive shaft 75.

In operation, the revolving motion of the crank throws 71 and 77 about the crankshaft axis imparts a compound motion to the cross bore yokes 67 and 79. This results in relative motion between the piston rods 59 and pistons. For example, in FIG. 2 the piston rods 59 slide vertically within the linear bearings 63 in agreement with the vertical components of the circular motion of the crank throw 71. The bearing 63 serves to reduce a sliding friction between the piston waists 55 and piston rods.

The present invention is also concerned with the provision of a single heat source to serve all the cylinders of the Stirling engine. As illustrated in FIGS. 1-3, the two pairs of cylinders 3 and 8 emanate from the single heat source 13. The transverse piston rod and yoke of the Stirling engine of the present invention allows the use of a single heat source as well as a single crankshaft.

Figure 4:
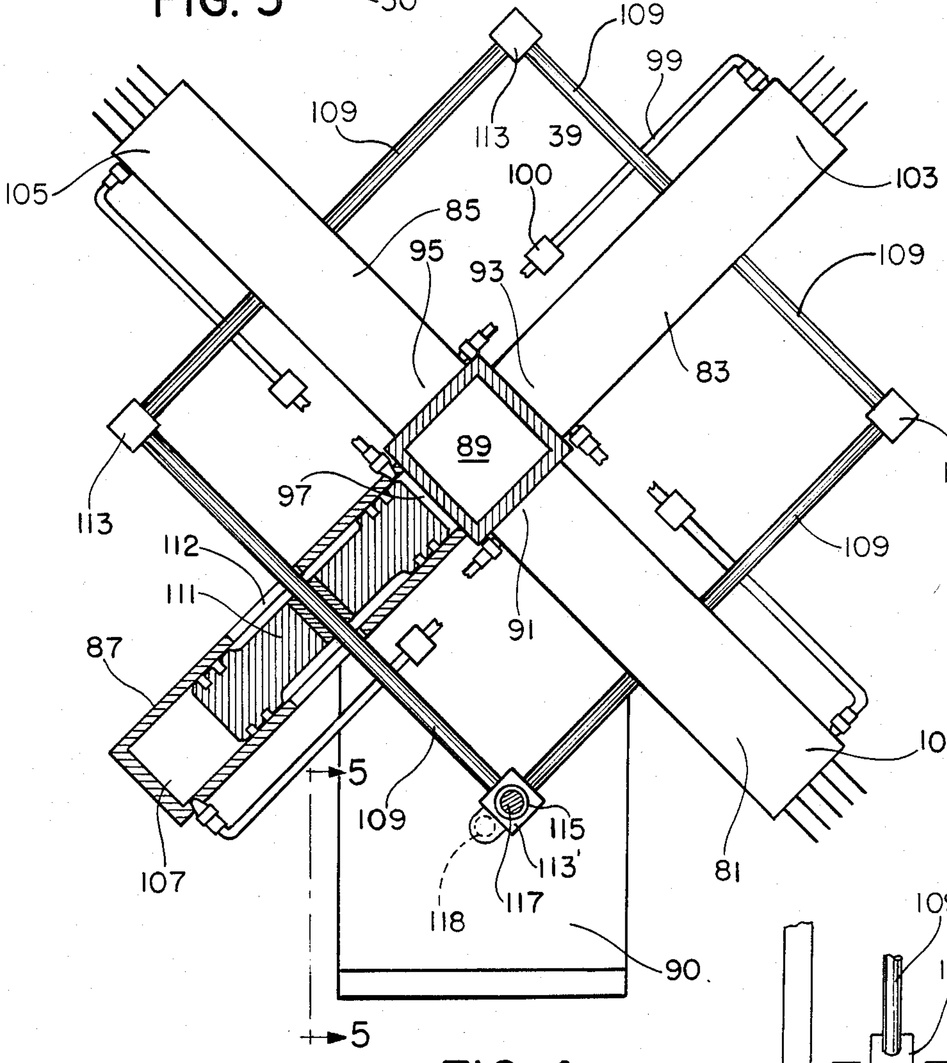
FIG. 4 is a front view, partially in section, of a modified embodiment of a Stirling engine incorporating the present invention.
Figure 5:
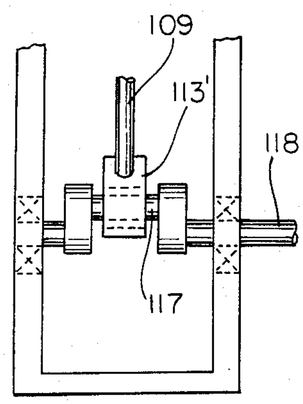
FIG. 5 is a view taken along lines 5—5 of FIG. 4.

FIGS. 4 and 5 illustrate a modified embodiment of the Stirling engine incorporating the present invention. In this embodiment, the cylinders 81, 83, 85, and 87 lie in an X-shaped arrangement around common heat source 89 which is supported by a frame 90. The hot ends 91, 93, 95, and 97 of the cylinders are connected by conduits 99 and regenerators 100 to the cool ends 107, 101, 103, and 105 of adjacent cylinders, respectively, in a manner similar to that previously described.

To transmit the reciprocating motion of the pistons outside the cylinders, a piston rod 109 extends transversely through each piston 111 and cylinder slot 112 in a manner similar to that previously described. In the embodiment of the present invention illustrated in FIGS. 4 and 5, both ends of each piston rod are joined to the ends of the neighboring rods at junction blocks 113. One junction block, designated 113', is constructed with a journal bearing 115 adapted to receive the crank throw 117 of a crankshaft 118. In this embodiment, only one throw is required on crankshaft 118. The quadrature relationship between the four cylinders 81, 83, 85, and 87 is maintained as in the previous embodiment.

Figure 6:
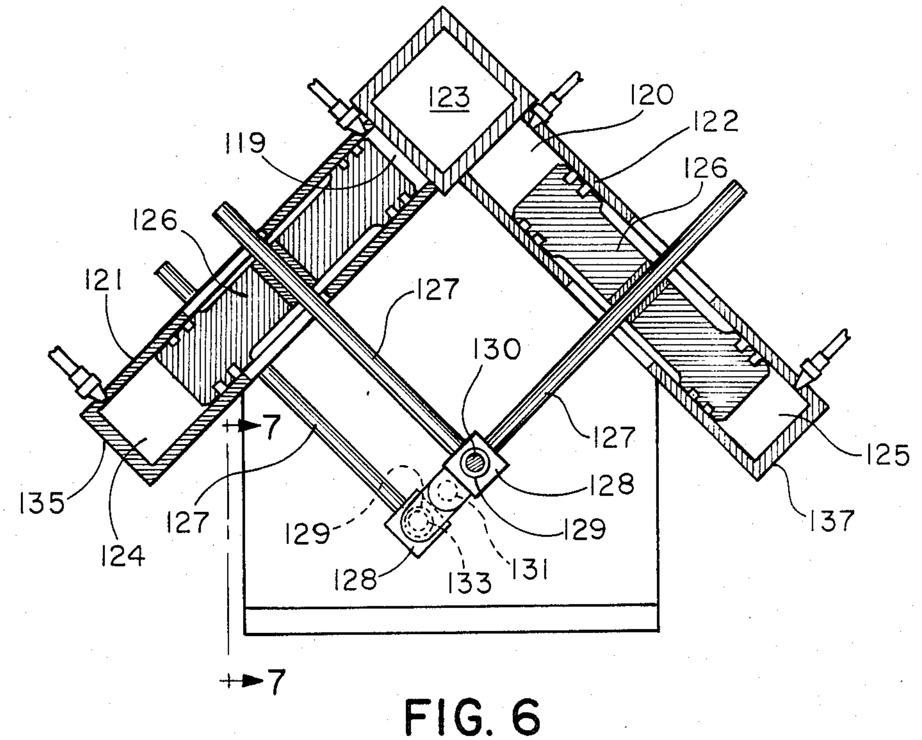
FIG. 6 is a front view, partially in section, of a further modified embodiment of a Stirling engine incorporating the present invention.
Figure 7:
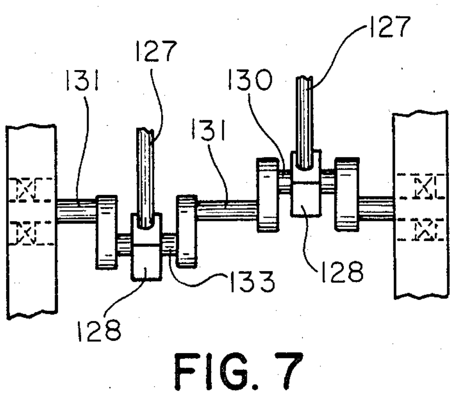
FIG. 7 is a view taken along lines 7—7 of FIG. 6.

FIGS. 6 and 7 illustrate a further modified embodiment of the Stirling engine incorporating the present invention. In this embodiment, the cylinder axes are disposed at 90°, so that the engine acquires a "V" shape. Preferably the V is inverted. Two "V" pairs may be stacked to form an engine with eight cylinder spaces. As in the previously described embodiments, the hot ends 119, 120 of the cylinders 121, 122, respectively, are located close together and are joined to the walls of a common heat source 123. The cool ends 124, 125 are at the maximum distance from the hot ends. The crankshaft 131 is located between the cool ends. Pistons 126 reciprocate within the cylinders in a manner similar to that previously described.

Extending through each piston 126 is a piston rod 127. The piston rods of the cylinders in the "V" intersect at 90° and are joined to a connecting block 128. The connecting block is constructed with a suitable journal bearing 129 for receiving the crank throw 130 of crankshaft 131. The piston rod-crankshaft mechanism is duplicated for each bank of "V" cylinders. Thus, with a two "V" engine, a crankshaft having a second crank throw 133 is required. The crank throws 130 and 133 are disposed at 180° to each other. The 180° throw relationship affords the advantage of a crankshaft with perfect static and dynamic balance, and hence no counterweights are required. For proper operation of the engine and to maintain the quadrature relationship between the four cylinders, the conduits for shuttling the working fluid between the cylinder spaces must be altered from the arrangement depicted in FIG. 1. As with the previous embodiments, the location of the cool ends 124 and 125 remote from the heat source 123 simplifies the required cooling apparatus.

Thus, it is apparent that there has been provided, in accordance with the invention, a Stirling engine that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and the variations as fall within the spirit and broad scope of the appended claims.

I claim:

1. Apparatus for converting the direction of motion, such as converting reciprocating motion to rotary motion comprising:

(a) a frame;

(b) at least one cylinder mounted to the frame and defining a first axis, the cylinder having at least one longitudinal slot in the periphery thereof;

(c) a piston adapted to reciprocate within the cylinder along said first axis, the piston having a transverse aperture therethrough coinciding with the cylinder slot;

(d) a piston rod having a longitudinal axis and extending through the piston aperture and cylinder slot transversely with respect to said first axis;

(e) a cross bar yoke for fixedly receiving the ends of at least two piston rods, the yoke having a journal therein; and (f) a crankshaft mounted for rotation in the frame about a second axis which is offset from said first axis and perpendicular to said first axis and to the piston rod longitudinal axis and having a crank throw journaled in the yoke, so that the reciprocating motion of the piston transmitted to the piston rod produces sliding motion of the piston rod through the piston transversely to the first axis for rotating the crank shaft.

2. Apparatus for converting reciprocating motion to rotary motion comprising:

(a) a frame;

(b) at least two cylinders projecting outwardly from the frame, each cylinder defining a longitudinal first axis and at least one longitudinal slot in the periphery thereof;

(c) a piston adapted to reciprocate within each cylinder and having a transverse aperture therein coinciding with the associated cylinder slot;

(d) a piston rod having a longitudinal axis extending through each piston aperture and associated cylinder slot;

(e) a cross bar yoke for fixedly receiving the ends of at least two piston rods, the yoke having a journal therein; and (f) a crankshaft mounted for rotation in the frame about a second axis perpendicular to the longitudinal axes of the piston rods, the second axis being perpendicular to the cylinder first axes and offset therefrom, the crankshaft having at least one crank throw journaled in the yoke, so that the pistons reciprocate in unison and the piston rods slide transversely within the pistons and move in an orbit defined by the crank throw.

3. The apparatus of claim 2 wherein the cylinders project outwardly from the frame to form at least one pair of symmetrical cylinders with the cylinder first axes lying in the same plane as the associated piston rods longitudinal axes, and wherein the longitudinal axes of the cylinders of each pair of symmetrical cylinders intersect at 90°.

4. The apparatus of claim 3 wherein:

(a) at least two pairs of symmetrical cylinders and associated pistons are mounted to the frame in in-line side-by-side relationship;

(b) the cross bar yoke is adapted to fixedly receive the piston rods associated with each pair of cylinders; and (c) the crankshaft has a crank throw for journaled rotation in each cross bar yoke.

5. Apparatus for converting reciprocating motion to rotary motion comprising:

(a) a frame;

(b) at least two pairs of symmetrical cylinders mounted to the frame in in-line side-by-side relationship, each cylinder having a longitudinal axis and at least one longitudinal slot in the periphery thereof, each pair of cylinders comprising two cylinders projecting outwardly from the frame and having coaxial longitudinal axes;

(c) a piston adapted to reciprocate within each cylinder and having a transverse aperture therein coinciding with the associated slot;

(d) a piston rod having a longitudinal axis extending through each piston aperture and associated cylinder slot;

(e) a cross bar yoke adapted to receive the ends of the piston rods associated with each pair of cylinders; and (f) a crankshaft mounted for rotation in the frame, the crankshaft having a crank throw for journaled rotation in each cross bar yoke, so that the pistons reciprocate in unison to produce compound motion in the piston rods and yoke for rotating the crankshaft.

6. The apparatus of claim 5 wherein the crank throws of the crankshaft are 90° apart.

7. A double acting hot gas engine operating under a thermodynamic cycle for converting thermal energy to rotary energy, comprising:

(a) frame means for supporting the engine and including a central heat source;

(b) at least one cylinder means for carrying out the thermodynamic cycle therein projecting outwardly from the heat source, the cylinder means defining a first axis and having a hot end attached to the heat source and a cool end mechanically and thermally distant from the heat source;

(c) a piston for reciprocating within the cylinder means in accordance with the thermodynamic cycle, the piston having a transverse aperture therethrough;

(d) connecting means protruding transversely through the piston and cylinder means for transmitting the piston reciprocating motion outside the cylinder; and (e) a crankshaft mounted for rotation in the frame means about a second axis perpendicular to the first axis and non-intersecting therewith, the crankshaft having at least one crank throw journaled in the connecting means.

8. The hot gas engine of claim 7 wherein:

(a) the cylinder means comprises at least one pair of cylinders projecting symmetrically outwardly from the heat source and having parallel axes, each cylinder having at least one longitudinal slot in the periphery thereof; and (b) the connecting means comprises a piston rod extending transversely through each piston and associated cylinder slot and a junction block for receiving an end of the piston rods of each pair of symmetrical cylinders and having a journal therein for receiving a crankshaft crank throw.

9. The hot gas engine of claim 8 wherein the axes of the cylinders of each pair of symmetrical cylinders are co-axial.

10. The hot gas engine of claim 8 wherein the axes of the cylinders of each pair of symmetrical cylinders intersect at 90°.

11. The hot gas engine of claim 10 wherein there are two pairs of symmetrical cylinders mounted in in-line side-by-side relationship, and wherein the crank throws of the crankshaft are located at 180° to each other.

12. The hot gas engine of claim 7 wherein:

(a) the cylinder means comprises four cylinders projecting outwardly from the heat source at 90° to each other to form two pairs of symmetrical cylinders, the longitudinal axes of the cylinders lying in a common plane and the longitudinal axes of the cylinders of each pair of symmetrical cylinders being co-axial; and (b) the connecting means comprises a piston rod extending transversely through each piston and associated cylinder means and a plurality of junction means, each junction means being adapted to receive the ends of the piston rods of two adjacent cylinders, one of the junction means being provided with a journal for receiving the crankshaft crank throw.

13. Apparatus for converting reciprocating motion to rotary motion comprising:

(a) a frame;

(b) four cylinders mounted to and projecting outwardly from the frame, each cylinder defining a first longitudinal axis and a pair of opposed longitudinal slots in the cylinder periphery, the axes of the four cylinders lying in a common plane, the axis of each cylinder being at 90 to the axes of the adjacent cylinders to form two pairs of co-axial symmetrical cylinders;

(c) a piston adapted to reciprocate within each cylinder and having a transverse aperture therethrough communicating with the associated cylinder slots;

(d) a piston rod having a longitudinal axis extending through each piston aperture and aligned cylinder slots;

(e) a plurality of junction blocks, each junction block being adapted to fixedly receive the piston rods of two adjacent cylinders thereby forming a continuous rigid linkage joining all of the piston rods, the linkage lying in the same plane as the cylinder longitudinal axes; and (f) a crankshaft mounted in the frame for rotation therein about a second axis perpendicular to the plane of the piston rod linkage and the piston rod longitudinal axes, the crankshaft having a crank throw journaled in one of the junction blocks, so that as the crankshaft rotates the crank throw thereof imparts compound motion to the linkage and transverse sliding motion to the piston rods within the piston apertures.

14. Apparatus for converting reciprocating motion to rotary motion comprising:

(a) a frame;

(b) at least two pairs of cylinders mounted to the frame and projecting outwardly therefrom to form two pairs of symmetrical cylinders in in-line side-by-side relationship, each cylinder having a longitudinal axis and at least one longitudinal slot in the periphery thereof, the longitudinal axes of the cylinders of each pair of symmetrical cylinders intersecting at 90°;

(c) a piston adapted to reciprocate within each cylinder and having a transverse aperture therein coinciding with the associated cylinder slot;

(d) a piston rod extending through each piston aperture and associated cylinder slot;

(e) a junction block adapted to receive the piston rods associated with each pair of cylinders; and (f) a crankshaft having at least two crank throws mounted for rotation in the frame, the crank throws being journaled in the junction blocks, the crank throws of the crankshaft being located 180° apart.

* * * * *